(12) United States Patent
Morovic et al.

(10) Patent No.: US 10,691,988 B2
(45) Date of Patent: Jun. 23, 2020

(54) PRINTING OF A HALFTONE BASED ON MULTIPLE COLORANT DEPOSITION ORDERS

(71) Applicant: HEWLETT-PACKARD DEVELOPMENT COMPANY, L.P., Spring, TX (US)

(72) Inventors: Peter Morovic, Sant Cugat del Valles (ES); Jan Morovic, Colchester (GB); Xavier Farina Vargas, Sant Cugat del Valles (ES)

(73) Assignee: Hewlett-Packard Development Company, L.P., Spring, TX (US)

(*) Notice: Subject to any disclaimer, the term of this patent is extended or adjusted under 35 U.S.C. 154(b) by 0 days.

(21) Appl. No.: 16/336,958

(22) PCT Filed: Sep. 30, 2016

(86) PCT No.: PCT/US2016/054716
§ 371 (c)(1),
(2) Date: Mar. 27, 2019

(87) PCT Pub. No.: WO2018/063306
PCT Pub. Date: Apr. 5, 2018

(65) Prior Publication Data
US 2020/0034675 A1 Jan. 30, 2020

(51) Int. Cl.
*G06K 15/02* (2006.01)
*H04N 1/405* (2006.01)
*H04N 1/52* (2006.01)

(52) U.S. Cl.
CPC ..... *G06K 15/1881* (2013.01); *G06K 15/1809* (2013.01); *H04N 1/405* (2013.01); *H04N 1/52* (2013.01)

(58) Field of Classification Search
None
See application file for complete search history.

(56) References Cited

U.S. PATENT DOCUMENTS 6,213,586 B1 4/2001 Chen
7,034,968 B2 4/2006 Bhaskar et al.
(Continued)

FOREIGN PATENT DOCUMENTS

| CN | 101099376 | 1/2008 |
| CN | 101462413 | 6/2009 |
| WO | 2018063306 A1 | 4/2018 |

OTHER PUBLICATIONS

Yuanyuan Qu, "Color Prediction and Separation Models in Printing," Linkoping Studies in Science and Technology, Dissertation No. 1540, Norrkoping, Aug. 2013, 176 p.
(Continued)

*Primary Examiner* — Scott A Rogers
(74) *Attorney, Agent, or Firm* — HP Inc. Patent Department

(57) ABSTRACT

Example methods of controlling printing of a halftone image are disclosed as well as apparatuses and computer-readable storage mediums relating thereto. In an example, the method includes receiving input data indicating a first colorant deposition order for a colorant combination and a second colorant deposition order for the colorant combination, wherein the second colorant deposition order is different from the first colorant deposition order. Control data is generated based on the input data. The control data includes first pixel data associating a first pixel in the halftone image with the first colorant deposition order, and second pixel data associating a second pixel in the halftone image with the second colorant deposition order. The control data is used to control a printer to print the halftone.

15 Claims, 11 Drawing Sheets

(56) References Cited

U.S. PATENT DOCUMENTS

| | | | |
|---|---|---|---|
| 7,306,311 B2* | 12/2007 | Yamanobe | B41J 2/2132 347/15 |
| 8,064,112 B1 | 11/2011 | Bernasconi | |
| 8,228,559 B2 | 7/2012 | Parmar et al. | |
| 8,270,049 B2 | 9/2012 | McElvain | |
| 8,964,247 B2 | 2/2015 | Shin et al. | |
| 9,367,772 B2 | 6/2016 | Maccari | |
| 2003/0174186 A1 | 9/2003 | Valero et al. | |
| 2005/0083540 A1 | 4/2005 | Hersch et al. | |
| 2011/0032573 A1 | 2/2011 | Dalal et al. | |
| 2014/0225953 A1 | 8/2014 | Robinson et al. | |
| 2019/0297225 A1* | 9/2019 | Maestro Garcia | H04N 1/644 |

OTHER PUBLICATIONS

Morovic et al., "Hans: Controlling Ink-Jet Print Attributes via Neugebauer Primary Area Coverages," IEEE Trans Image Process. Feb. 2012, 1 p.

HPDC, "International Search Report and Written Opinion," May 4, 2017, International App. No. PCT/US2016/0547167, 7 p.

Zeng et al., "An Expanded Neugebauer Model For Printer Color Formation," Rochester Institute of Technology, RIT Scholar Works, Rochester, NY, 1998, 11 p.

* cited by examiner

| NP Index | CMYKn | CMYK1 | CMYK2 | CMYK3 |
|---|---|---|---|---|
| 1 | [0 2 1 0 0] | [0 1 1 0] | [0 1 0 0] | [0 0 0 0] |
| 2 | [0 2 1 0 1] | [0 0 1 0] | [0 1 0 0] | [0 1 0 0] |
| 3 | [0 2 1 0 2] | [0 1 1 0] | [0 0 0 0] | [0 1 0 0] |
| N | [. . . .] | [. . . .] | [. . . .] | [. . . .] |

PRINTING OF A HALFTONE BASED ON MULTIPLE COLORANT DEPOSITION ORDERS

BACKGROUND

A printing system may be associated with a color space (hereinafter termed a "colorant color space"), defined by one or more colorants available to the printing system for deposition or application to a print medium. An example of a colorant color space is the Cyan, Magenta, Yellow, BlacK (CMYK) color space, wherein four variables are used in a subtractive color model to represent respective quantities of colorants. Examples of colorants include inks, dyes, pigments, paints, toners and powders.

BRIEF DESCRIPTION OF THE DRAWINGS

Various features and advantages of the present disclosure will be apparent from the detailed description which follows, taken in conjunction with the accompanying drawings, which together illustrate, by way of example only, features of the present disclosure, and wherein:

FIG. 1A is a schematic diagram showing a data structure 100 defining a plurality of augmented Neugebauer Primary (NP), vectors for use in a halftoning process in accordance with an example.

FIG. 1B is a schematic diagram showing a NP area coverage (NPac) vector in accordance with an example.

DETAILED DESCRIPTION

Figure 1C:
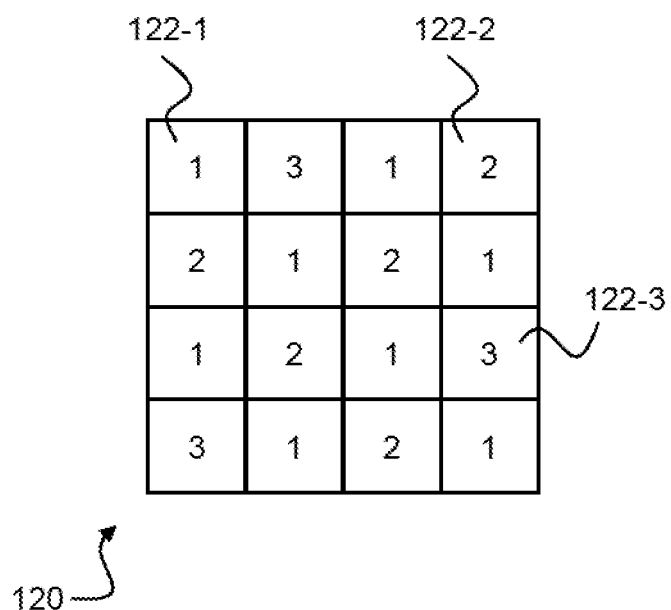
FIG. 1C is a schematic diagram showing a data structure for controlling printing of a halftone in accordance with an example.

A printing system may utilize a halftoning process to reproduce a continuous tone image in the colorant color space using a series of shapes (e.g. dots). This enables the printing system to approximate a continuous tone image by using a discrete number of colorant levels (e.g. a discrete number of ink drops). The result of this process is an output in the form of a color separated halftone comprising a halftone plane corresponding to each colorant available to the printing system. The output of any particular printing system is dependent on the characteristics of the particular printing pipeline (i.e. the set of data processing elements used in the printing processes) that is used by the printing system.

The colorant content of a print resolution pixel (hereinafter termed "pixel") may be defined in terms of a Neugebauer Primary (NP) vector, which specifies a combination of colorants to be deposited at a pixel location in a deposition process to produce the desired color for the pixel. Each element of NP vector may specify a quantity of a respective colorant for the associated pixel in the colorant color space. For example, an NP vector of [1 1 0 0] defined in a CMYK colorant color space specifies a pixel comprising one unit (e.g. drop) of cyan colorant and one unit of magenta colorant.

According to some print processes, a halftone may be printed or formed on the print medium in a plurality of deposition or application stages. For example, the halftone may be printed using a plurality of static print bars, or a plurality of passes performed by a moveable head unit. A masking process may be used to distribute the constituent colorants for each pixel in the halftone to a plurality of partial halftones corresponding to the plurality of deposition stages. Typically, decomposition of the halftone into the plurality of partial halftones for the plurality of deposition stages is performed by applying a filtering or masking process the halftone, wherein the decomposition is configured to ensure that the resultant partial halftones combine to produce the halftone and also satisfy one or more statistical properties.

In the following description, for purposes of explanation, numerous specific details of certain examples are set forth. Reference in the description to "an example" or similar language means that a particular feature, structure, or characteristic described in connection with the example is included in at least that one example, but not necessarily in other examples.

The order in which a combination of colorants is applied to a print medium for a given pixel can affect the resultant print properties of the pixel and, in some cases, adjacent pixels. For example, the colorant deposition order for a given colorant combination can affect print properties such as color, coalescence and/or grain. To some extent, this variation in print properties can be accommodated or utilized by applying a masking process that changes the average colorant deposition order for pixels in a halftone. For example, the masking process may utilize a filter that is designed to decompose a halftone into a plurality of partial halftones, which together provide a particular average colorant deposition order or a certain average temporal spacing between colorants deposited for pixels in the halftone. However, such approaches do not provide control of colorant deposition order on a per-pixel basis, and thus do not provide control of print properties for the halftone at the print or pixel-resolution level.

Certain examples described herein provide print-resolution control of colorant deposition order in halftones. In particular, certain examples utilize pixel level masking as part of a halftoning process to provide print-resolution control of print properties, such as color, coalescence and/or grain.

According to some examples, each individual pixel in a halftone is associated with a respective pixel-level mask. Each pixel-level mask defines the deposition order for the colorants to be deposited at the respective pixel, and therefore provides pixel-resolution control of print properties for the resultant halftone. In some examples, a pixel-level mask is specified in an element in an NP vector (hereinafter termed an "augmented NP vector") which indicates the colorant combination for a pixel in the halftone. In other words, a given pixel in the halftone may be associated with an augmented NP vector which specifies both a colorant combination and a deposition order for the colorant combination.

FIG. 1A shows an example of a data structure 100 defining a plurality of augmented NP vectors 102-N for use in a printing pipeline and, in particular, a halftoning process. The data structure 100 defines a plurality of augmented NP vectors for a printing system associated with a CMYK colorant space (i.e. a printing system utilizing CMYK colorants). Each augmented NP vector 102-N is associated with an index (stored in a first column 104-1) and a vector specifying a colorant combination and a pixel mask (stored in a second column 104-2). In this example, each augmented NP vector comprises five elements: four elements corresponding to the CMYK colorants and a fifth element specifying a pixel mask or color deposition order for the colorants (e.g. [C M Y K Z] where Z indicates the pixel mask or color deposition order).

In some examples, the augmented NP vectors defined in the data structure 100 may be decomposed, based on the pixel mask, into NP vectors corresponding to a combination of colorants to be deposited at each deposition stage (hereinafter termed "deposition vectors"). In the example shown in FIG. 1A, the data structure 100 defines a plurality of augmented NP vectors 102-N for a printing system which provides three deposition stages (e.g. three print bars or three passes). Accordingly, columns 104-3, 104-4 and 104-5 store deposition vectors specifying colorant combinations to be deposited at each of the respective three deposition stages.

According to the example shown in FIG. 1A, the data structure 100 defines a first augmented NP vector 102-1 is associated with index #1 in column 104-1 and vector [0 2 1 0 0] in column 104-2. Thus, the first augmented NP vector 102-1 defines a colorant combination of 2M1Y (e.g. two drops of magenta ink and one drop of yellow ink) to be deposited according to pixel mask #0. This combination of colorant combination and pixel mask corresponds to deposition vectors [0 1 1 0], [0 1 0 0] and [0 0 0 0] as shown in columns 104-3, 104-4 and 104-5 respectively, thereby defining a colorant combination of 1M1Y (e.g. one drop of magenta ink and one drop of yellow ink) to be deposited in the first deposition stage, a colorant combination of 1M (e.g. one drop of magenta ink) to be deposited in the second deposition stage, and no colorants to be deposited in the third deposition stage. The data structure of FIG. 1A further specifies a second augmented NP vector 102-2 which is associated with index #2 in column 104-1 and vector [0 2 1 0 1] in column 104-2. Thus, the second augmented NP vector 102-2 defines a colorant combination of 2M1Y (e.g. two drops of magenta ink and one drop of yellow ink) to be deposited according to pixel mask #1. This combination of colorant combination and pixel mask may be decomposed to produce deposition vectors [0 0 1 0], [0 1 0 0] and [0 1 0 0] in columns 104-3, 104-4 and 104-5 respectively, thereby defining a colorant combination of 1Y (e.g. one drop of yellow ink) to be deposited in the first deposition stage, a colorant combination of 1M (e.g. one drop of magenta) to be deposited in the second deposition stage, a colorant combination of 1M (e.g. one drop of magenta ink) to be deposited in the third deposition stage. Finally, the data structure 100 of FIG. 1A specifies a third augmented NP vector 102-3 which is associated with index #3 in column 104-1 and vector [0 2 1 0 2] in column 104-2. Thus, the third augmented NP vector 102-3 defines a colorant combination of 2M1Y (e.g. two drops of magenta ink and one drop of yellow ink) to be deposited according to pixel mask #2. This combination of colorant combination and pixel mask may be decomposed to produce deposition vectors [0 1 1 0], [0 0 0 0] and [0 1 0 0] in columns 104-3, 104-4 and 104-5, thereby defining a colorant combination of 1M1Y (e.g. one drop of magenta ink and one drop of yellow ink) to be deposited in the first deposition stage, no colorants to be deposited in the second deposition stage, and a colorant combination of 1M (e.g. one drop of magenta ink) to be deposited in the third deposition stage. In this manner, the data structure 100 defines three augmented NP vectors 102-1, 102-2 and 102-3 which specify the same colorant combination (i.e. 2M1Y) but each define a different pixel level masking (i.e. a different colorant deposition orders for the same colorant combination).

In some examples, the data structure 100 may be formatted as a lookup table indexed by column 104-1 for use in a halftoning process. Moreover, it will be appreciated that, in some examples, the deposition vectors in columns 104-3, 104-4 and 104-5 may be generated dynamically, as required, to reduce storage requirements for the data structure 100. For example, the deposition vectors may be generated based on the augmented NP vector and one or more pixel mask definitions defined in a look-up table. In further examples, the deposition vectors may be generated dynamically on a functional basis, according to one or more parameters. For example, the one or more parameters may specify one or more conditions for assignment of colorants to the plurality of deposition stages.

Augmentation of the NP vectors to include pixel-level mask information in the manner described provides access to an expanded number of pixel states in the halftone, compared to a case where conventional NP vectors are used. For example, in the case of a printing system comprising CMYK colorants and three print bars (i.e. three colorant deposition stages), the associated augmented NP vector space provides discrete control over colorant deposition in twelve channels with each channel taking a value of 0 or 1. In other words, the augmented NP vector space provides access to $2^{12}$=4096 possible pixel states. In contrast, where a NP vector space is used that does not provide pixel-level mask information, access is restricted to four channels with each channel taking a values in the range 0 to 3. In other words, the conventional NP vector space provides access to only $4^4$=256 possible pixel states.

The augmented NP vectors defined in data structure 100 may be assigned to pixels in a halftone during a halftoning process. In some examples, the halftoning process may utilize an intermediate color space to map from an input color space (e.g. Red, Green, Blue, RGB) to colors defined by the augmented NPs in the data structure 100. An example of a suitable intermediate color space for this purpose is the Neugebauer Primary area coverage (NPac) color space. In this context, an NPac vector represents a statistical distribution of one or more augmented NPs defined in data structure 100 over an area of a halftone. In other words, an NPac vector defines the probability for each NP for each pixel in the halftone (e.g. a likelihood that a particular NP is to be placed at each pixel location in the halftone). In this manner, a given NPac vector defines a set of parameters that are used in the halftoning process to map a color defined in the image color space to one or more augmented NP vectors to be statistically distributed over the plurality of pixels for a halftone. Moreover, because each of the augmented NP vector specifies a pixel mask (i.e. colorant deposition order) in addition to the associated colorant combination for the pixel, the NPac color space also provides control over the statistical distribution of colorant deposition order over the plurality of pixels forming the halftone. In other words, the NPac color provides statistical control of pixel state in terms of colorant content and colorant deposition order for pixels in the halftone.

FIG. 1B shows an example of an NPac vector 110 which specifies a statistical distribution of augmented NPs for an example halftone patch. In this context, the term "halftone patch" refers to an area of a halftone that is associate with a constant NPac. Each element of the NPac 110 vector specifies an augmented NP vector by reference to the indexes specified in column 104-1 of data structure 100 of FIG. 1, together with a respective area coverage for the specified augmented NP vector. In particular, the first element 112-1 of NPac vector 110 specifies that 50 percent of the pixels in the halftone patch should be printed according to augmented NP vector #1 defined in row 102-1 of data structure 100, the second element 112-2 of NPac vector 110 specifies that 31 percent of pixels in the halftone patch should printed according to augmented NP vector #2 defined in row 102-2 of data structure 100, and the third element 112-3 of NPac vector 110 specifies that 19 percent of pixels in the halftone patch should be printed according to augmented NP vector #3 defined in row 102-3 of data structure 100. Accordingly, with reference to data structure 100, NPac 110 will result in a halftone patch wherein each pixel is associated with the same combination of colorants but the deposition order for the colorants will vary in accordance with the statistical distribution specified in the NPac 110. In other words, the statistical distribution of masking or drop deposition order can be controlled at pixel level for the halftone patch, thereby providing improved control over printing properties for the halftone patch. It should be noted that, in some examples, the NPac 110 may additionally specify the probability that pixels in the halftone patch comprise no colorants, and/or specify the probability that pixels in the halftone patch are assigned to a zero NP vector (i.e. an NP vector with all elements equal to zero).

As discussed above, the NPac 110 of FIG. 1B, in combination with the data structure 100 of FIG. 1A, is used in a halftoning process to generate control data for printing a halftone. Moreover, because the NPac 110 provides means to control the statistical distribution of different colorant deposition orders, this information can be included in the control data to provide pixel-level control of printing properties of the resultant halftone. In other words, the output of the halftoning process is control data specifying individual pixel states which fulfil or implement the augmented NP probability distribution specified in the associated NPac vector.

An example of control data 120 resulting from this halftoning process is shown in FIG. 1C. In this example, the control data 120 takes the form of a 4 by 4 array, with each element of the array comprising pixel data specifying an augmented NP vector for a corresponding pixel in a 4 by 4 pixel halftone or a 4 by 4 section of a halftone. A first element 122-1 in the control data 120 specifies that a corresponding first pixel in the halftone is to be printed according to the augmented NP vector defined in row 102-1 of data structure 100; a second element 122-2 in the control data 120 specifies that a corresponding second pixel in the halftone should be printed according to the augmented NP vector defined in row 102-2 of data structure 100; and a third element 122-3 in the control data 120 specifies that a corresponding third pixel in the halftone should be printed according to the augmented NP vector defined in row 102-3 of data structure 100. Accordingly, with reference to data structure 100 of FIG. 1A, it will be apparent that control data 120 defines a halftone wherein each pixel is associated with the same colorant combination (i.e. 2M1Y) but the deposition order for the colorant combination is distributed according to the probabilities specified in the associated NPac vector 110. Accordingly, the control data 120 indicates that 8 of the 16 pixels in the halftone (i.e. 50 percent) should be printed according to a first colorant deposition order, 5 of the 16 pixels in the halftone (i.e. 31 percent) should be printed according to a second colorant deposition order, and 3 of the 16 pixels in the halftone should be printed according to a third deposition order. In this manner, the control data 120 specifies colorant content and colorant deposition for each pixel to be printed in the halftone.

Figure 2:
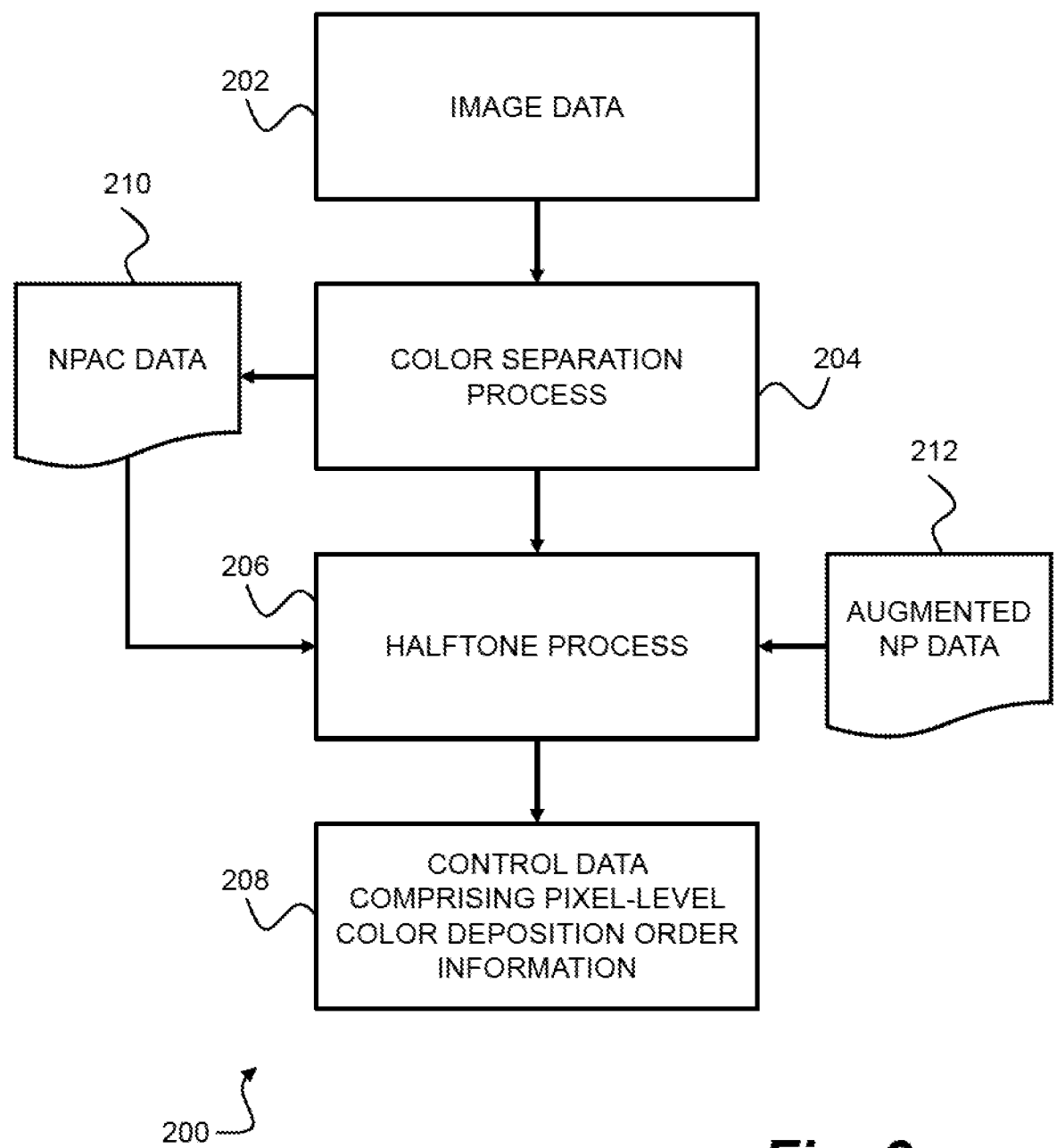
FIG. 2 is a schematic diagram showing a printing pipeline in accordance with an example.

FIG. 2 shows an example of a printing pipeline 200 for generating control data to control printing a halftone. The printing pipeline 200 receives image data 202 that is passed into a color separation process 204. The image data 202 may comprise color data represented in an image color space, such as image-level pixel representations in a RGB color space. The color separation process 204 maps the color data from the image color space to an intermediate color space. In this example, the intermediate color space comprises an area coverage space, for example the NPac color space described above with reference to FIGS. 1A, 1B and 1C. The area coverage color space is used as a domain within which the color separation process 204 and a halftoning process 206 communicate (i.e. an output color is defined by an area coverage representation that specifies a particular area coverage of one or more augmented NP vectors). This area coverage representation may comprise an NPac vector defined in NPac data 210 as shown in FIG. 2. The halftoning process 206 is configured to distribute the proportions of each augmented NP vector as defined by the area coverage representation, for example based on the NPac data 210 output by the color separation process. In other words, for each pixel in the halftone, the halftoning process 206 is configured to select a single augmented NP vector from the NPac vector, based on the probability distribution defined in the NPac vector. The halftone process 206 may receive one or more augmented NP definitions in the form of augmented NP data 212. As such, the printing pipeline 200 produces control data 208 specifying an augmented NP vector corresponding to each pixel in the halftone, wherein the spatial density of the augmented NP vectors is defined in area coverage color space and controls the colorimetry of the halftone. Spatial distribution of the augmented NP vectors according to the probabilities specified in the NPac vector may be performed using any suitable halftoning methods as is known in the art. In this respect, examples of suitable halftoning methods include matrix-selector-based PARAWACS (Parallel Random Area Weighted Area Coverage Selection) techniques and techniques based on error diffusion. An example of an imaging system that uses area coverage representations for halftone generation is a Halftone Area Neugebauer Separation (HANS) pipeline.

Figure 3:
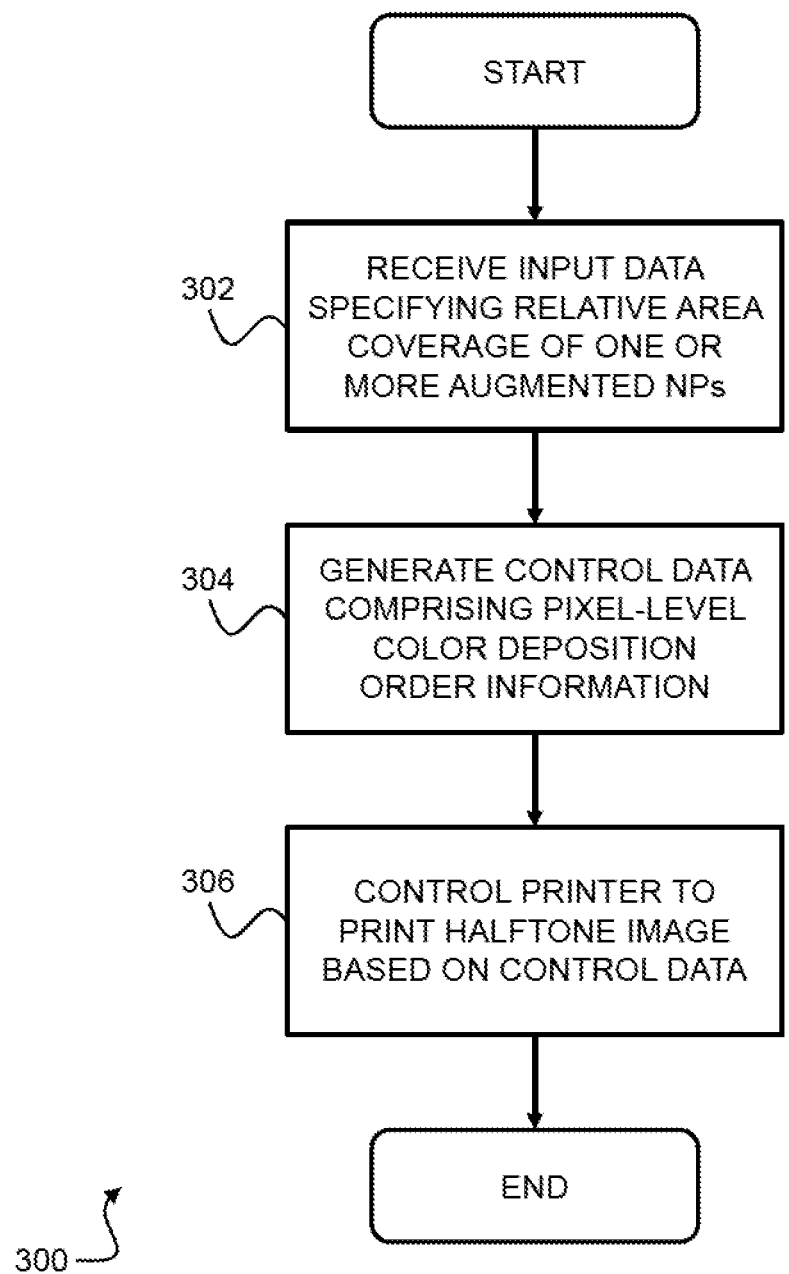
FIG. 3 is a flow diagram showing a method of controlling printing of a halftone in accordance with an example.

FIG. 3 is a flow diagram illustrating an example method 300 of generating control data for controlling printing of a halftone. In some examples example, the method 300 may be performed by a processing component of a printing system. At block 302 input data representative of the NPac vector resulting from a color separation process is received by the processing component. As discussed above the NPac specifies the relative area coverage of one or more augmented NP vectors for pixels in a halftone. At block 304, the processing component uses a halftoning technique to generate control data for printing of the halftone in accordance with the NPac specified in the input data. The control data may, for example, include first pixel data specifying a first colorant deposition order for a particular colorant combination for a first pixel in the halftone, and second pixel data specifying a second colorant deposition order for the same colorant combination for a second pixel in the halftone. At block 306, the processing component uses the control data generated in block 304 to control a colorant deposition component of the printing system to print the halftone in accordance with the colorant deposition orders specified in the pixel data.

In some examples, the control data 208 generated in the halftoning process 206 may be used to control colorant deposition by a printing system directly. For example, the control data may be used by a printing system to control a first print bar in a plurality of print bars to deposit a first colorant at a first pixel location and a second colorant at a second pixel location in a first colorant deposition step; and control a second print bar in the plurality of print bars to deposit the second colorant at the first pixel location and the first colorant at the second pixel location in a second colorant deposition step. In another example, the printing system may comprise a moveable head unit configured to make a plurality of passes with respect to a print medium. In this example, controlling the colorant deposition component at block 306 may include controlling the moveable head unit to deposit a first colorant at the first pixel and a second colorant at the second pixel in a first pass; and controlling the moveable head unit to deposit the second colorant at the first pixel and the first colorant at the second pixel in a second pass. In other words, the control data resulting from the halftoning process may be used to directly control the colorant deposition order for every pixel in the resultant halftone.

In further examples, the control data generated in block 306 of method 300 may be used in a masking process to generate a plurality of partial halftones, wherein each partial halftone specifies a set of colorants to be deposited at each deposition stage of the printing process. In particular, the masking process utilizes the pixel level masking data contained in the control data to distribute colorants for each pixel to the partial halftones corresponding to each of the deposition stages.

Figure 4:
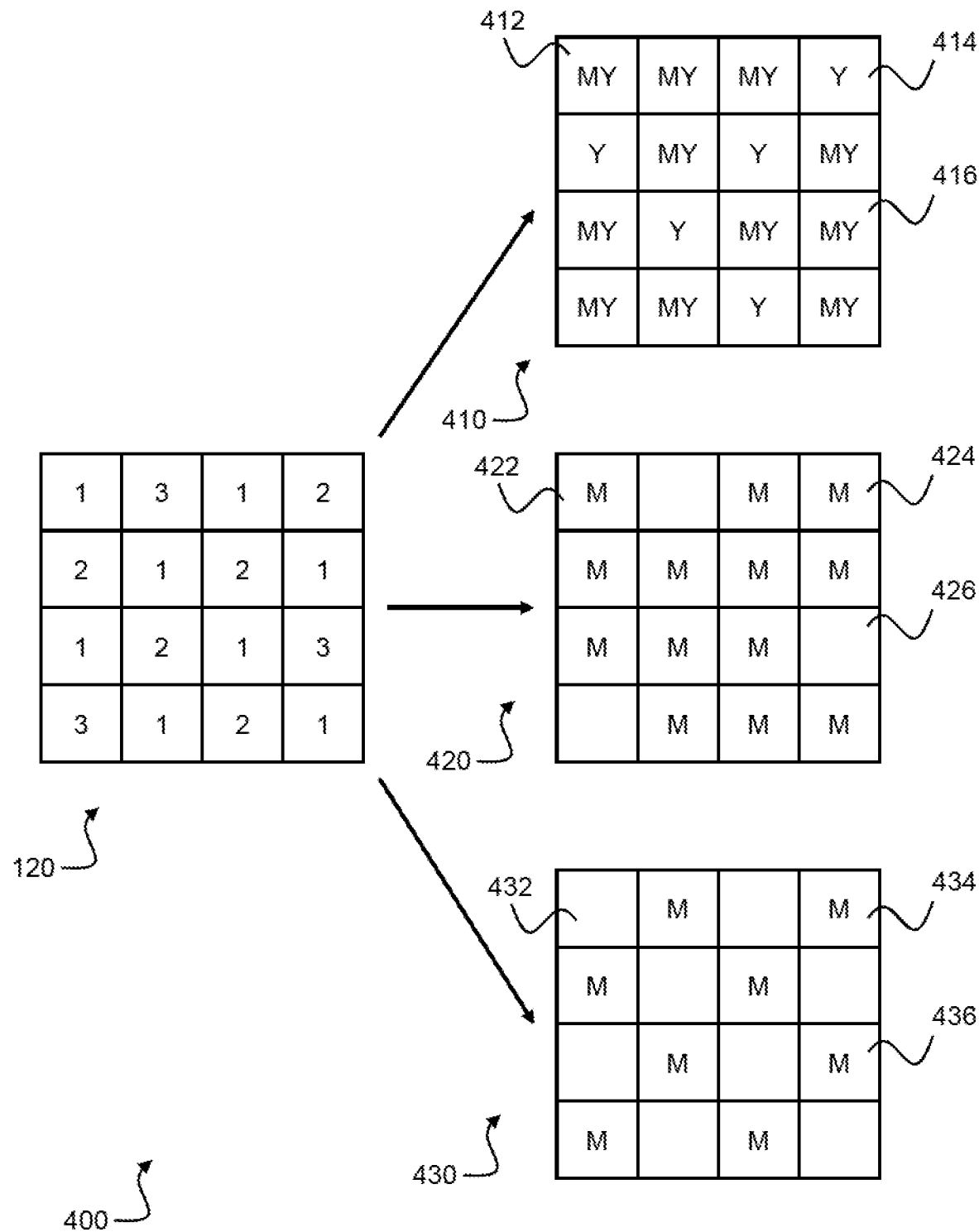
FIG. 4 is a schematic diagram showing generation of plurality of partial halftones in accordance with an example.

FIG. 4 shows an example of a masking process 400 based on the augmented NP vectors defined in data structure 100 and specified in control data 120. As discussed above, control data 120 specifies an augmented NP vector for each pixel that includes pixel masking data for a printing process providing three deposition stages (e.g. three print bars or three passes). Accordingly, the control data 120 may be decomposed into three partial halftones 410, 420 and 430 corresponding to each of the respective deposition stages. For example, pixel data in the control data corresponding to augmented NP index #1 is decomposed to provide a MY pixel 412 in the first partial halftone 410, a M pixel 422 in the second partial halftone 420 and a white (i.e. no colorant) pixel 432 in the third partial halftone 430; pixel data in the control data corresponding to augmented NP index #2 is decomposed to provide a Y pixel 414 in the first partial halftone 410, a M pixel 424 in the second partial halftone 420 and a M pixel 434 in the third partial halftone 430; and pixel data in the control data corresponding to augmented NP index #3 is decomposed to provide a MY pixel 416 in the first partial halftone 410, a white (i.e. no colorant) pixel 426 in the second partial halftone 420 and a M pixel 436 in the third partial halftone 430.

Figure 5:
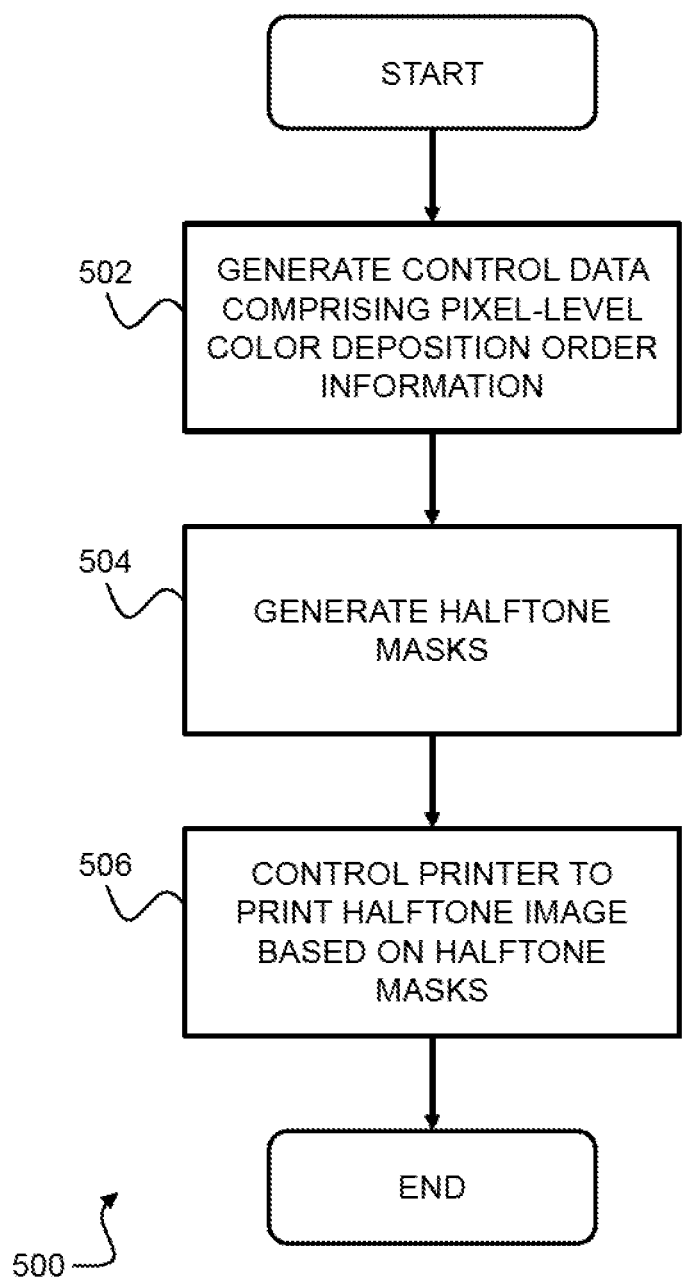
FIG. 5 is a flow diagram showing a method of controlling printing of a halftone in accordance with an example.

FIG. 5 is a flow diagram illustrating an example method 500 of generating halftone data for controlling printing of a halftone. In some examples, the method 500 may be performed by a processing component of a printing system. At block 502, the control data generated in the halftoning process 206 of FIG. 2 is received or accessed by the processing component. As discussed above, the control data comprises pixel data specifying an augmented NP vector for each pixel in the halftone. At block 504 the pixel data is used to generate a plurality of partial halftones corresponding to respective colorant deposition stages, based on the augmented NP vectors associated with each pixel in the halftone. In this context, each partial halftone specifies a set of colorants to be deposited at respective pixels in the halftone. At block 506, the partial halftones are used to control the colorant deposition system to print the halftone image by specifying, for each deposition stage, which colorants to deposit at each pixel location in the halftone. Thus, in the context of the present examples, the output of the masking process is a control data defining a plurality of partial halftones corresponding respective colorant deposition stages in the printing system.

According to certain examples, the mapping from image color space (e.g. RGB) to an intermediate color space defined in terms of a statistical distribution of augmented NP vectors (e.g. NPac) provides direct access to all the possible states of the printing system comprising multiple deposition stages. For example, this mapping can be utilized to control colorant deposition order on a color-by-color basis, thereby providing additional control over the printer properties and colorimetry of the resulting halftone (e.g. an NPac may be specified to ensure that, on average, adjacent pixels of comprising the same colorant combination are associated with different colorant deposition orders).

According to certain examples, the mapping from image color space (e.g. RGB) to an intermediate color space which defines color deposition orders at pixel level, enables halftoning and pixel masking to be performed in a single operation. Such examples therefore provide simplification of the printing pipeline.

In the examples described above, each augmented NP vector comprises five elements in the case of a CMYK colorant space: four elements corresponding to the CMYK colorants and a fifth element specifying a pixel mask or color deposition order for the colorants (e.g. [C M Y K Z] where Z indicates the pixel mask or color deposition order). In further examples, the augmented NP vector may comprise an element corresponding to each colorant at each depositions stage. Thus, where a printing system is associated with a CMYK colorant space and three deposition stages, the corresponding augmented NP vectors may be defined as [$C_1$ $M_1$ $Y_1$ $K_1$ $C_2$ $M_2$ $Y_2$ $K_2$ $C_3$ $M_3$ $Y_3$ $K_3$], where the subscript refers to the particular deposition stage. In other words, the augmented NP vector explicitly represents a 12-channel pixel state, encompassing deposition order. Thus, with reference to FIG. 1A, augmented NP vector 102-1 may be equivalently represented as [0 1 1 0 0 1 0 0 0 0 0 0], augmented NP vector 102-1 may be equivalently represented as [0 0 1 0 0 1 0 0 0 0 0 0], and augmented NP vector 102-1 may be equivalently represented as [0 1 1 0 0 0 0 0 0 1 0 0]. By representing the pixel state explicitly in this manner, the printing pipeline may operate directly on the augmented NP vectors without requiring an additional pixel-level masking steps. In effect, these examples allow the printer to be addressed directly in twelve channels, with each channel taking a value of 0 or 1.

Figure 6:
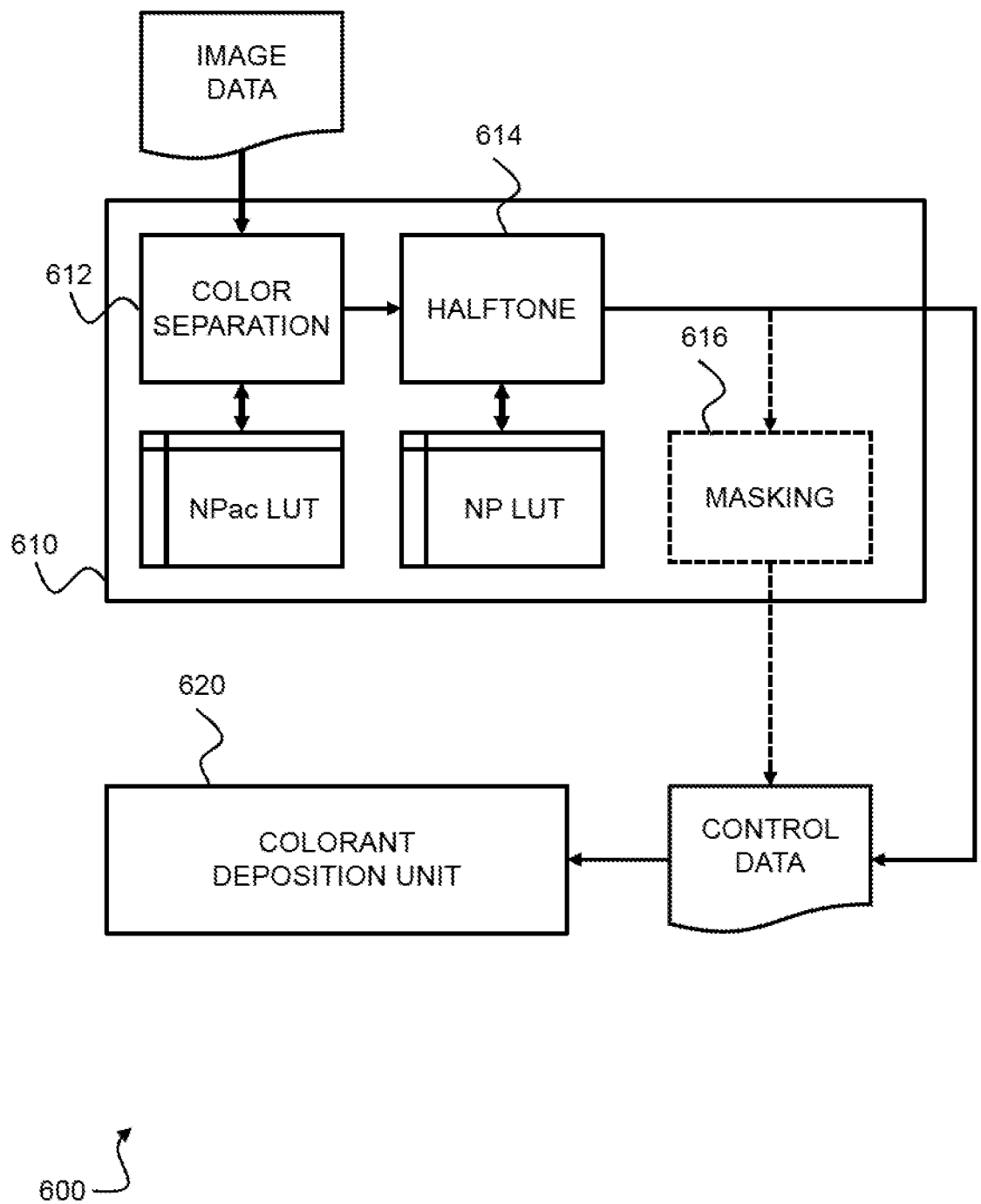
FIG. 6 is a schematic diagram showing an apparatus for controlling printing of a halftone in accordance with an example.

FIG. 6 shows an example system 600 for controlling printing of a halftone, comprising a processing unit 610 and a color deposition unit 620. In some examples, the processing unit 610 and the color deposition unit 620 may be part of a single printing apparatus. In other examples, the processing unit 610 and the color deposition unit 620 may be part of separate apparatuses. The color deposition unit 620 may comprise a plurality of print bars (not shown) which, under the control of the processing unit 610, are configured to deposit colorants on a print medium (not shown) in a plurality of deposition phases. In other examples, the color deposition unit 620 may comprise a moveable head unit (not shown) which, under the control of the processing unit 610, is configured to deposit colorants on a print medium (not shown) in a plurality of passes.

The processing unit 610 comprises a color separation component 612, a halftone component 614 and a masking component 616. The color separation unit 612 is configured to receive image data for an image defined in an image color space and convert the image data to an area coverage color space in a color separation process. For example, the color separation unit 612 may map from the input color space to the NPac color space described above with reference to FIGS. 1 to 5, based on an NPac look-up table.

The halftoning unit 612 receives the NPac vectors output from the color separation process and generates control data for printing a halftone by reference to a plurality of augmented NP vectors stored in an NP look-up table. The result of this halftoning process is control data which associates each pixel in the halftone with a colorant combination and a colorant deposition order for the colorant combination. For example, the control data may include first pixel data that associates a first pixel in the halftone with the first colorant deposition order and second pixel data that associates a second pixel in the halftone with a second colorant deposition order, wherein the second deposition order is different from the first deposition order. Following this process, the control data may be provided directly to the colorant deposition unit 620 to control printing of the halftone. For example, the control data may cause the color deposition unit 620 to deposit a first set of colorants at the first pixel and the second pixel in a first colorant deposition phase, in accordance with the control data; and control the color deposition system to deposit a second set of colorants at the first pixel and the second pixel in a second colorant deposition phase, in accordance with the control data. In examples where the color deposition unit comprises a plurality of print bars, deposition of the first set of colorants may be performed by a first print bar in the plurality of print bars and deposition of the second set of colorants may be performed by a second print bar in the plurality of print bars. In examples where the color deposition system comprises a moveable head unit, deposition of the first set of colorants may be performed in a first pass of the moveable head unit and deposition of the second set of colorants may be performed in a second pass of the moveable head unit.

In other examples, the output of the halftoning process may be provided to the masking component 616 which in turn generates control data defining a plurality of print masks based on the color deposition orders specified in the augmented NP for each pixel. Following this process, the control data defining the plurality of print masks may be provided to the colorant deposition unit 620 to control printing of the halftone.

Figure 7:
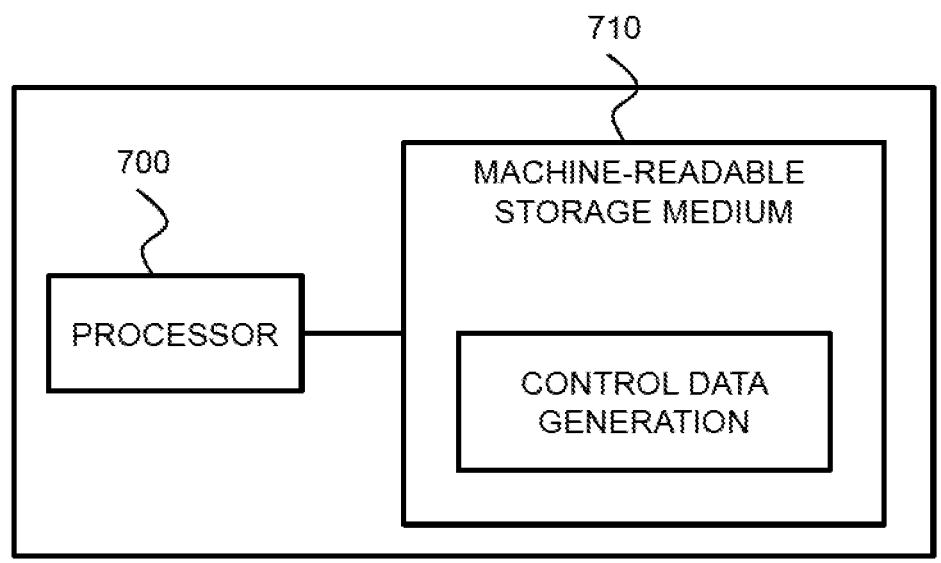
FIG. 7 is a schematic diagram of a printing system in accordance with an example.

Certain methods and systems as described herein may be implemented by a processor that processes computer program code that is retrieved from a non-transitory storage medium. FIG. 7 shows an example of a printing system 700 comprising a machine-readable storage medium 710 coupled to a processor 720. Machine-readable media 710 can be any non-transitory media that can contain, store, or maintain programs and data for use by or in connection with an instruction execution system. Machine-readable media can comprise any one of many physical media such as, for example, electronic, magnetic, optical, electromagnetic, or semiconductor media. More specific examples of suitable machine-readable media include, but are not limited to, a hard drive, a random access memory (RAM), a read-only memory (ROM), an erasable programmable read-only memory, or a portable disc. In FIG. 7, the machine-readable storage medium comprises program code to implement generation of control data using the techniques described above with reference to FIGS. 1 to 6.

Figure 8A:
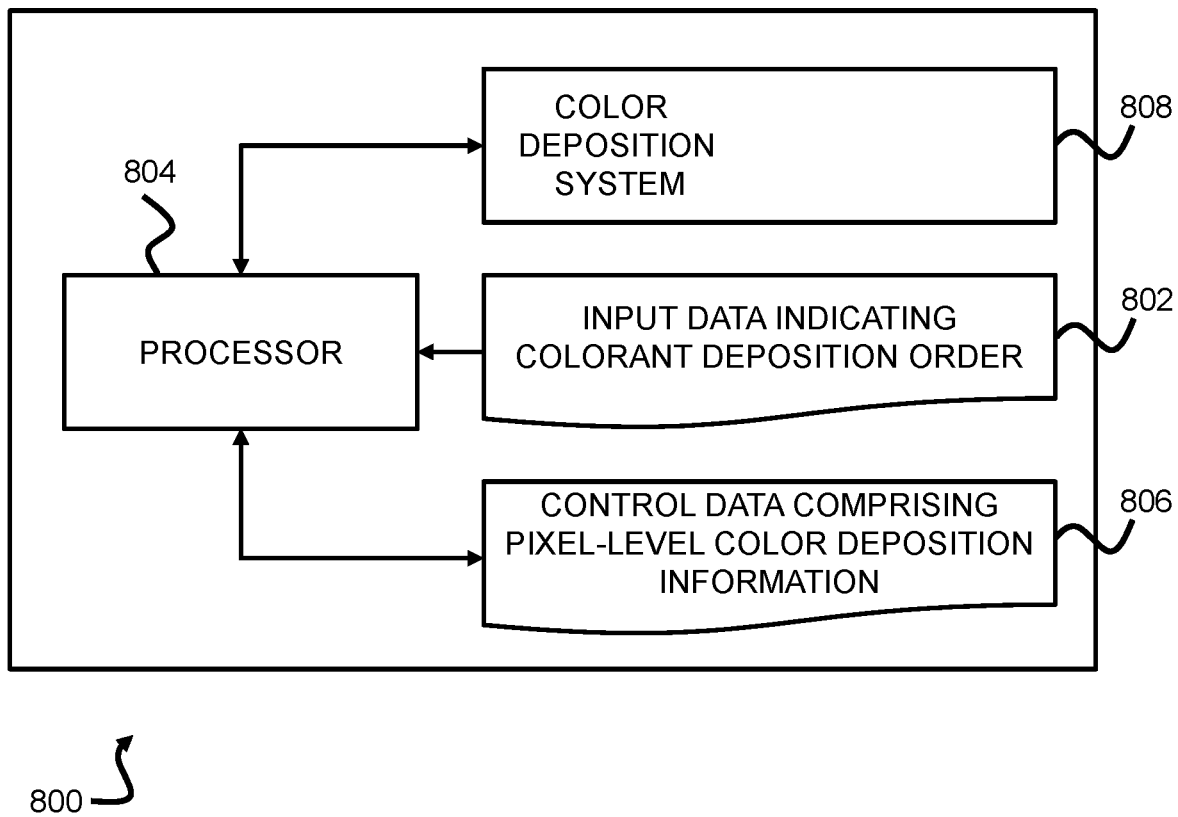
FIG. 8A is a schematic diagram showing an apparatus in accordance with an example.

FIG. 8A shows an example of an apparatus 800 for printing an image. The apparatus 800 includes a color deposition system 808 to deposit a plurality of colorants on a print medium under the control of a processor 804. The processor 804 executes one or more instructions to receive input data 802 indicating a first colorant deposition order for a colorant combination and a second colorant deposition order for the colorant combination, the second colorant deposition order being different from the first colorant deposition order. For example, the input data may comprise data defining a plurality of augmented NP vectors as explained above with reference to FIGS. 1 to 7. In some examples, the input data may be stored locally by the apparatus 800, whereas in other examples the input data may be received from an external device such as a computer system (not shown) in communication with the apparatus 800. Based on the input data 802, the processor 804 generates control data 806 for printing a halftone using the color deposition system 808. For example, the processor 804 may use the input data in a halftoning process to assign the first and second colorant deposition orders to pixels in the halftone in accordance with the probabilities or area coverages defined in an NPac vector determined in a color separation process. As a result, the control data 806 comprises first pixel data associating a first pixel in a halftone with the first colorant deposition order, and second pixel data associating a second pixel in the halftone with the second colorant deposition order. The processor 804 uses the generated control data 806 to control the color deposition system 808 to print the halftone in accordance with the assigned colorant deposition orders.

In some examples, the processor 804 controls the color deposition system 808 to deposit a first set of colorants at the first pixel and the second pixel in a first colorant deposition step, in accordance with the control data, and deposit a second set of colorants at the first pixel and the second pixel in a second colorant deposition step, in accordance with the control data 806.

Figure 8B:
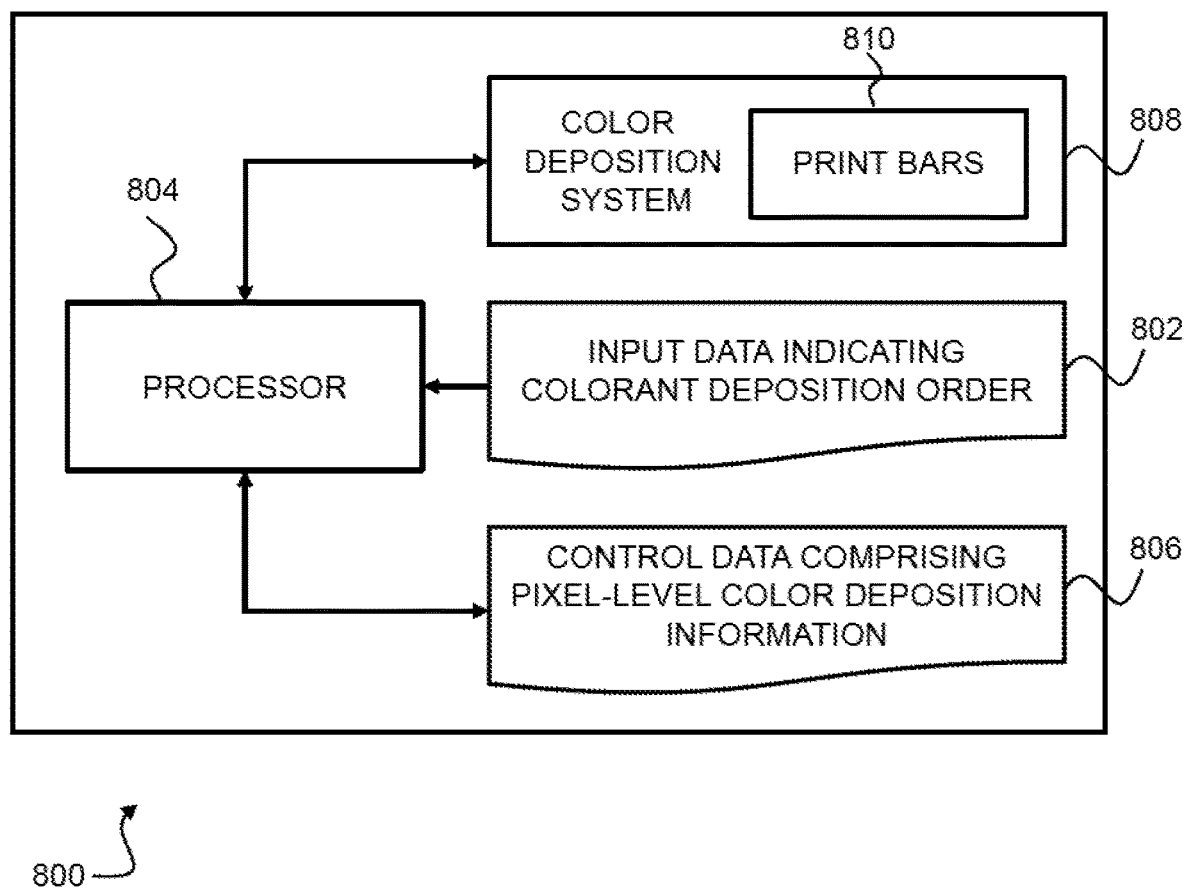
FIG. 8B is a schematic diagram showing an apparatus comprising a plurality of print bars in accordance with an example.

In some examples, the color deposition system 808 of the apparatus 800 shown in FIG. 8A may comprises a plurality of print bars 810, as shown in FIG. 8B (components common to FIGS. 8A and 8B are provided with the same reference numerals). In such examples, deposition of the first set of colorants may be performed by a first print bar in the plurality of print bars and deposition of the second set of colorants may be performed by a second print bar in the plurality of print bars.

Figure 8C:
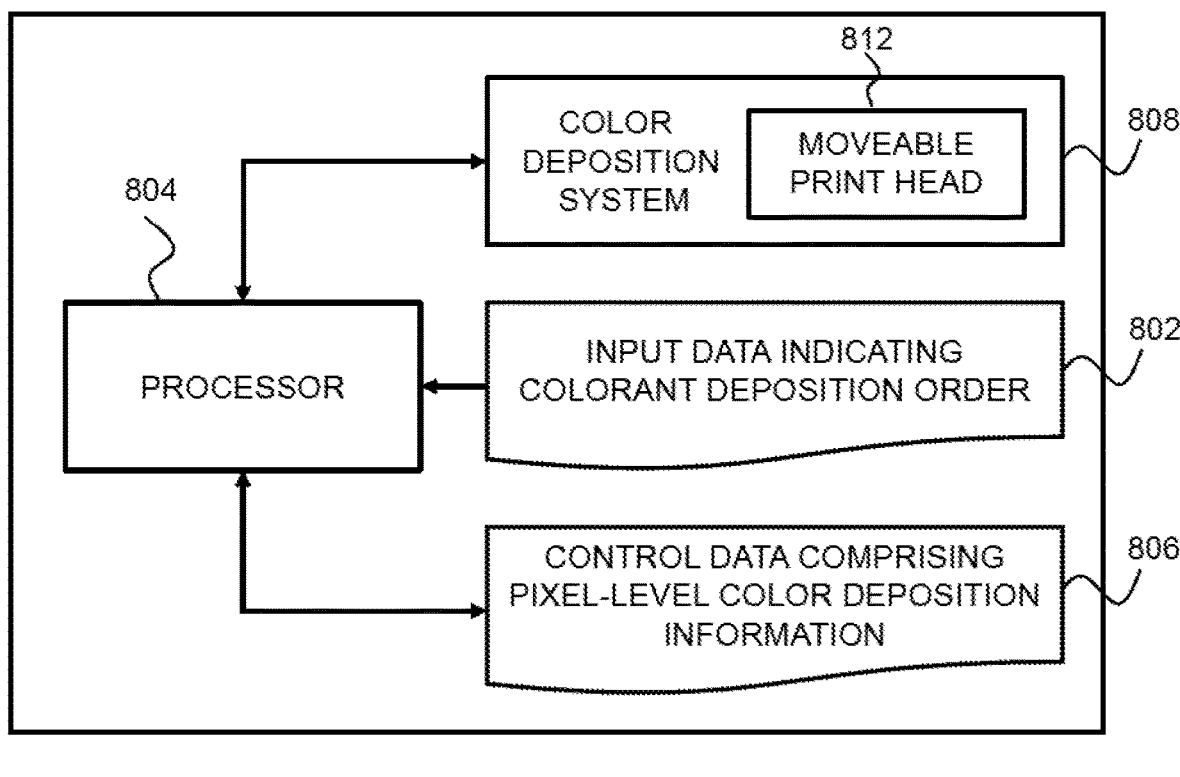
FIG. 8C is a schematic diagram showing an apparatus comprising a moveable head unit in accordance with an example.

In other examples, the color deposition system 808 of the apparatus 800 shown in FIG. 8A may comprises a moveable head unit 812, as shown in FIG. 8C (components common to FIGS. 8A and 8B are provided with the same reference numerals). In such examples, deposition of the first set of colorants may be performed in a first pass of the moveable head unit with respect to the print medium, and deposition of the second set of colorants may be performed in a second pass of the moveable head unit with respect to the print medium.

The preceding description has been presented to illustrate and describe examples of the principles described. This description is not intended to be exhaustive or to limit these principles to any precise form disclosed. Many modifications and variations are possible in light of the above teaching. Although the flow diagram in FIG. 6 shows a specific order of execution, the order of execution may differ from that which is depicted.

What is claimed is:

1. A method of controlling printing of a halftone, the method comprising:
   receiving input data representing a first colorant deposition order for a colorant combination and a second colorant deposition order for the colorant combination, the second colorant deposition order being different from the first colorant deposition order;
   generating control data comprising:
      first pixel data associating a first pixel in the halftone with the first colorant deposition order; and
      second pixel data associating a second pixel in the halftone with the second colorant deposition order; and
   controlling a printer to print the halftone based on the control data.

2. The method of claim 1, wherein the input data comprises a set of parameters to control assignment of the first colorant deposition order and the second colorant deposition order to pixels in the halftone.

3. The method of claim 2, further comprising assigning the first colorant deposition order to the first pixel and the second colorant deposition order to the second pixel based on the set of parameters.

4. The method of claim 2, wherein the plurality parameters specify a statistical distribution of the first colorant deposition order and the second colorant deposition order for pixels in the halftone.

5. The method of claim 1, wherein the first colorant deposition order is specified by a first pixel mask, and the second colorant deposition order is specified by a second pixel mask, the second pixel mask being different from the first pixel mask.

6. The method of claim 5, wherein:
   the first pixel mask specifies a first colorant to be deposited in a first colorant deposition step and a second colorant to be deposited in a second colorant deposition step; and
   the second pixel mask specifies the second colorant to be deposited in the first colorant deposition step and the first colorant to be deposited in the second colorant deposition step.

7. The method of claim 6, wherein the printer comprises a plurality of print bars located at different locations with respect to a print medium, and controlling the printer to print the halftone based on the control data comprises:
   controlling a first print bar in the plurality of print bars to deposit the first colorant at the first pixel and the second colorant at the second pixel in the first colorant deposition step; and
   controlling a second print bar in the plurality of print bars to deposit the second colorant at the first pixel and the first colorant at the second pixel in the second colorant deposition step.

8. The method of claim 6, wherein the printer comprises a moveable head unit configured to make a plurality of passes with respect to a print medium, and controlling the printer to print the halftone based on the control data comprises:
   controlling the moveable head unit to deposit the first colorant at the first pixel and the second colorant at the second pixel in a first pass of the plurality of passes; and
   controlling the moveable head unit to deposit the second colorant at the first pixel and the first colorant at the second pixel in a second pass of the plurality of passes.

9. The method of claim 1, wherein:
   the input data represents the first colorant deposition order by specifying, for each colorant in the colorant combination, a colorant quantity to be deposited at each of a plurality of deposition stages; and
   the input data represents the second colorant deposition order by specifying, for each colorant in the colorant combination, a colorant quantity to be deposited at each of the plurality of deposition stages.

10. A non-transitory computer-readable storage medium comprising computer-executable instructions which, when executed by a processor, cause a computing device to:
    receive control data comprising:
       first pixel data associating a first pixel in a halftone with a first colorant deposition order for a colorant combination;
       second pixel data associating a second pixel in the halftone with a second colorant deposition order for the colorant combination, the second colorant deposition order being different from the first colorant deposition order;
    generate first mask data based on the first pixel data and the second pixel data, the first mask data indicating a first set of colorants to be deposited at the first pixel and the second pixel;
    generate second mask data based on the first pixel data and the second pixel data, the first mask data indicating a second set of colorants to be deposited at the first pixel and the second pixel after deposition of the first set of colorants; and
    control printing of the halftone by a printer based on the first mask data and the second mask data.

11. The non-transitory computer-readable storage medium of claim 10, wherein the computer-executable instructions, when executed by the processor, cause the computing device to:
    control the printer to deposit the first set of colorants at the first pixel and the second pixel in a first deposition step; and
    control the printer to deposit the second set of colorants at the first pixel and the second pixel in a second printing step, wherein the second deposition step is performed after the first deposition step.

12. An apparatus comprising:
    a color deposition system to deposit a plurality of colorants on a print medium;
    a processor; and
    a memory storing computer-executable instructions which, when executed by the processor, cause the processor to:

receive input data indicating a first colorant deposition order for a colorant combination and a second colorant deposition order for the colorant combination, the second colorant deposition order being different from the first colorant deposition order;

generate control data comprising:
first pixel data associating a first pixel in a halftone with the first colorant deposition order;
second pixel data associating a second pixel in the halftone with the second colorant deposition order; and control the color deposition system to print the halftone based on the control data.

13. The apparatus of claim 12, wherein the computer-executable instructions, when executed by the processor, cause the processor to control the color deposition system to:
deposit a first set of colorants at the first pixel and the second pixel in a first colorant deposition step, in accordance with the control data; and
deposit a second set of colorants at the first pixel and the second pixel in a second colorant deposition step, in accordance with the control data.

14. The apparatus of claim 13, wherein the color deposition system comprises a plurality of print bars and deposition of the first set of colorants is performed by a first print bar in the plurality of print bars and deposition of the second set of colorants is performed by a second print bar in the plurality of print bars.

15. The apparatus of claim 13, wherein the color deposition system comprises a moveable head unit and the deposition of the first set of colorants is to be performed in a first pass of the moveable head unit and the deposition of the second set of colorants is to be performed in a second pass of the moveable head unit.

* * * * *